United States Patent [19]

Takamiya et al.

[11] Patent Number: 5,115,159
[45] Date of Patent: May 19, 1992

[54] BUILT-IN GENERATOR FOR BICYCLE

[75] Inventors: Kikuzo Takamiya, Kitamoto; Ritsuo Nishimura, Urawa, both of Japan

[73] Assignee: Bridgestone Cycle Co., Ltd., Tokyo, Japan

[21] Appl. No.: 601,639

[22] Filed: Oct. 23, 1990

[30] Foreign Application Priority Data

| Oct. 25, 1989 | [JP] | Japan | 1-275998 |
| Nov. 28, 1989 | [JP] | Japan | 1-306433 |
| Feb. 6, 1990 | [JP] | Japan | 2-25125 |
| Mar. 9, 1990 | [JP] | Japan | 2-56330 |

[51] Int. Cl.⁵ ................................. H02K 7/00
[52] U.S. Cl. .................. 310/67 A; 310/67 R; 310/156
[58] Field of Search ............ 310/67 A, 67 R, 83, 310/99, 156; 280/260; 74/594.2; 475/225, 294

[56] References Cited

U.S. PATENT DOCUMENTS

| 2,430,705 | 11/1947 | Brown | 310/67 A |
| 2,511,489 | 6/1950 | Woermbke | 310/67 A |
| 4,677,328 | 6/1987 | Kumakura | 310/67 A |
| 4,986,556 | 1/1991 | Hartmann | 280/260 |

Primary Examiner—Steven L. Stephan
Assistant Examiner—Matthew Nguyen
Attorney, Agent, or Firm—Parkhurst, Wendel & Rossi

[57] ABSTRACT

A built-in generator arranged within a hub of a bicycle wheel including a hub member of a wheel rotatably fitted on an axle fixed to a frame of the bicycle, a stationary hollow cylinder fixed to the axle in the hub member, a generating coil unit provided in the stationary hollow cylinder and fixed thereto, a rotor formed integrally with a magnet rotatably provided on the axle, and a planetary transmission device for transmitting rotation of the hub member to the axle at increased speeds. The planetary transmission device is formed of at least one planetary roller device which includes a sun roller integral with the magnet and rotatably provided on the axle, a plurality of planet rollers arranged to be circumscribed on the sun roller, a planet carrier rotatably supporting the planet rollers, and an elastic ring circumscribing on the planet rollers. The planet rollers are in pressure-contact with the elastic ring and the sun roller.

14 Claims, 20 Drawing Sheets

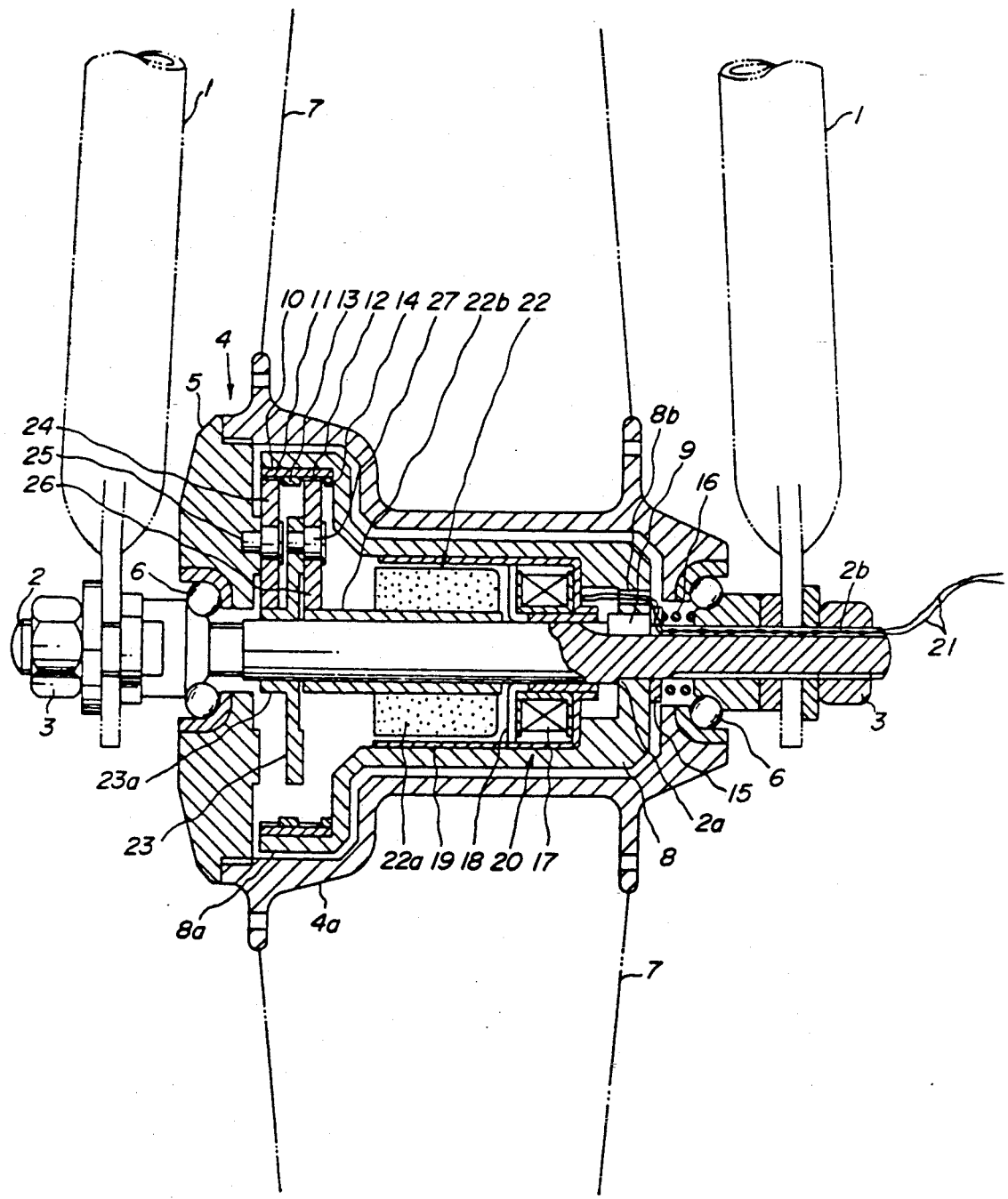

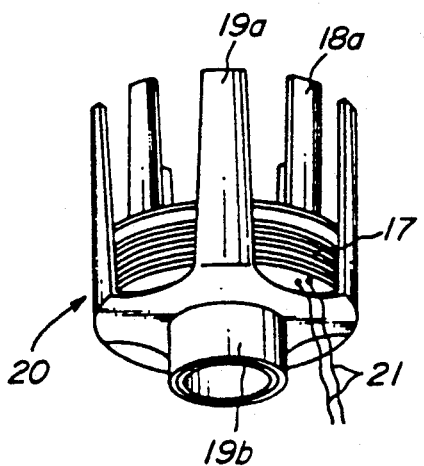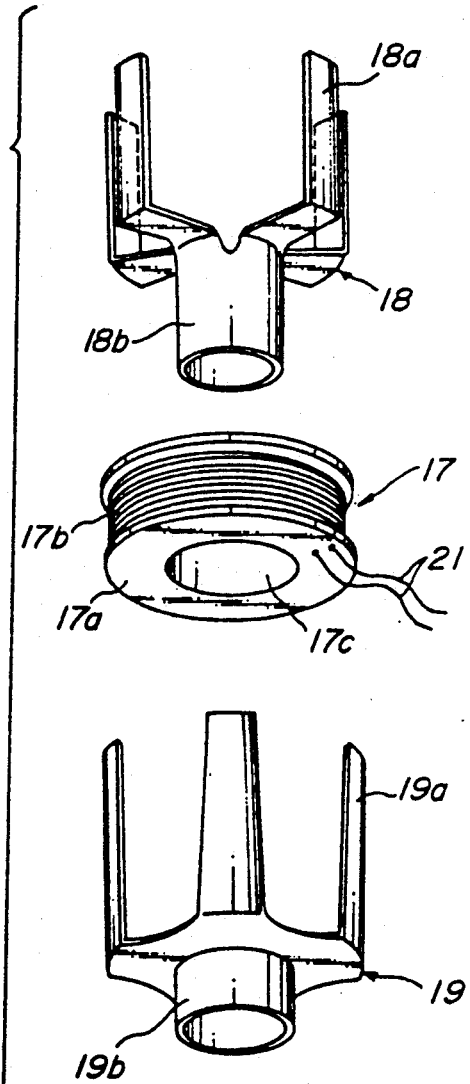

FIG_5

FIG_6

FIG_7

FIG_8

FIG_12

FIG_13

FIG_17

FIG_18

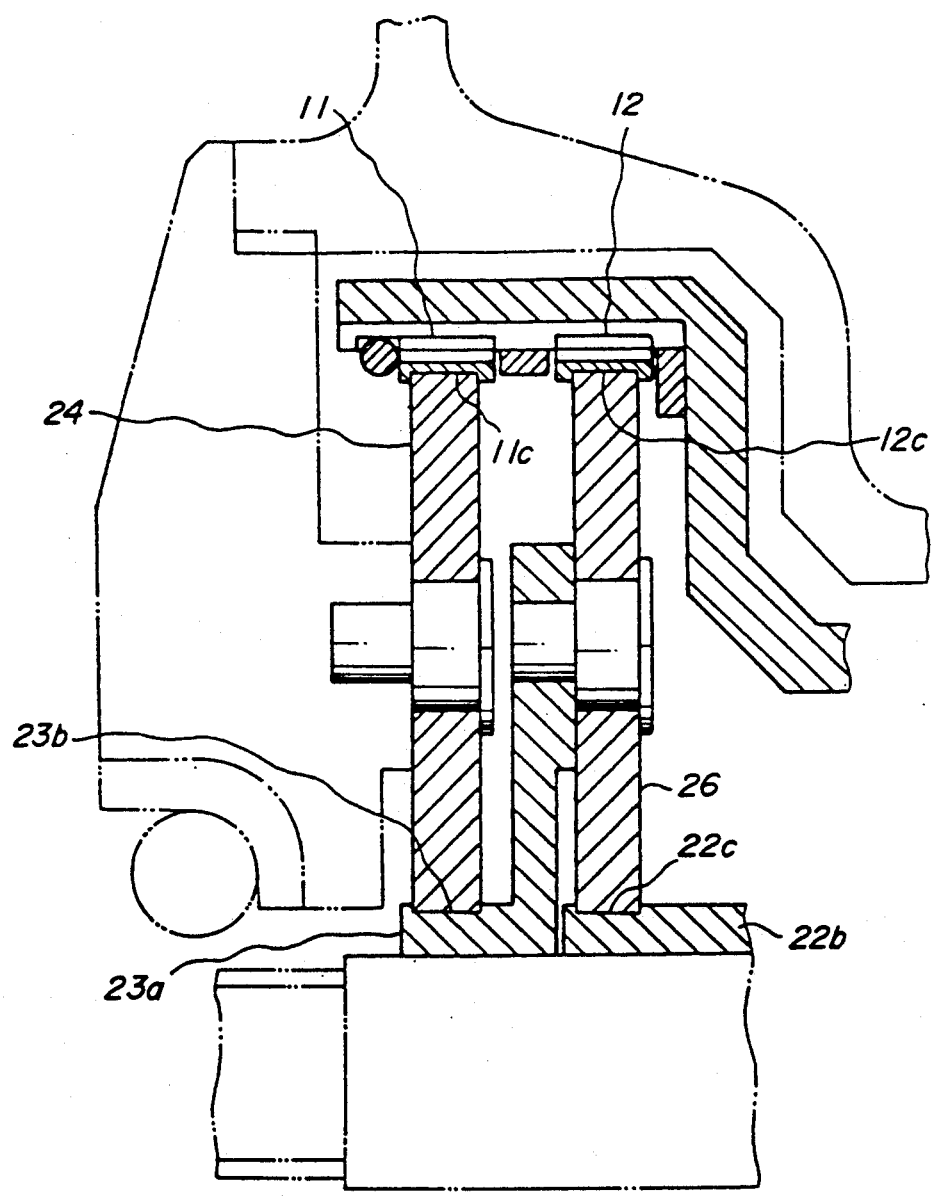
FIG_21

BUILT-IN GENERATOR FOR BICYCLE

BACKGROUND OF THE INVENTION

The present invention relates to a built-in generator arranged within a hub member of a bicycle wheel.

Generally, for supplying electric power to a bicycle lamp, use is made of a generator or dynamo which is in the form of a separate attachment mounted on the bicycle frame or fork. In such an attachment system, the dynamo includes a roller which is urged against the side wall or outer circumference of the tire to transmit its rotation to the roller with the aid of friction therebetween, so as to drive the dynamo and generate electric power.

It is required to rotate the roller at high speeds in order to generate sufficient electric power by the dynamo. With the attachment system, the high speed rotation of the roller is accomplished by using a small diameter roller which is driven by a large diameter tire. In this case, however, the mechanical transmission efficiency is generally very low, usually on the order of 50%, owing to the frictional transmission between the tire made of a rubber and the roller made of a metal. Moreover, the transmission efficiency is greatly affected by contact conditions of the friction surfaces, such as wetting, muddiness or the like, mounted conditions of the dynamo, and distortion of the wheel. Therefore, the transmission efficiency often further lowers depending upon the contact condition of the friction surfaces.

In the attachment system, moreover, the dynamo is mounted on the bicycle frame or fork as a separate part so that the dynamo partly protrudes outwardly of the bicycle. Cyclist's leg or the like body parts, or other obstacles are likely to touch the protrusion of the dynamo so that the protrusion would interfere with cyclist's operation of the bicycle. Moreover, when the protrusion of the dynamo is hit by obstacles as upon falling down of the bicycle, the mounting of the dynamo may be distorted. Therefore, the mounting of the dynamo must be carefully corrected or adjusted, requiring time-consuming and troublesome operations.

As described above, the hitherto used attachment system suffers from various disadvantages, i.e. low efficiency, interference with operation, troublesome maintenance and the like. Accordingly, there has been a long demand for an improved generator for bicycle, which is small-sized and lightweight and operates with a high efficiency without interfering with the operation of the bicycle.

In view of such a demand, the applicant has proposed an improved generator as disclosed in non-prepublished Japanese Patent Application Nos. 1-202,915; 1-202,916; and 1-202,917. According to the proposed construction, the generator is of a built-in type and arranged within a hub member of a bicycle wheel. In more detail, there is provided in the hub member a generating coil unit fixed to an axle, a rotor integral with a magnet provided rotatably on the axle, and planetary gears as a speed increasing device provided around the axle for transmitting the rotation of the axle to the rotor at increased speeds.

With such an arrangement of built-in generator, the rotation of the wheel is transmitted to the rotor at an increased speed of about twenty-five times the rotational speed of the wheel with the aid of the speed increasing action of at least one planetary gear device. In this case, for example, when a bicycle with the wheel diameter of 26 inches runs at a speed of 20 km/h, the rotor is rotated at a speed of as high as 4,000 rpm.

In general, gears used in the planetary gear device of this kind are small in size and inferior in accuracy. Besides, gears need back-lashes so that positional relations between the gears are not necessarily correct. Moreover, axes of the gears are likely to be shifted. Therefore, when such planetary gears are driven at high speeds, noise tends to occur at engaging portions of gear teeth.

Furthermore, there can be rapid start and stop during running of the bicycle. As the bicycle equipped with the built-in generator is rapidly stopped during running while generating electric power, the rotor of the generator undergoes a rapid change from a rotating condition at a high speed to a stopped condition. In this case, the planetary gears are subjected to a substantial load due to the inertia mass of the rotor.

In general, as the planetary gears of this kind are preferably small and lightweight, resulting in insufficient strength. Thus, although the small gears serve sufficiently to operate in a usual power generating condition, there is often a risk of the gears being damaged due to a substantial load resulting from the rapid stopping or the like.

SUMMARY OF THE INVENTION

It is an object of the present invention to provide an improved generating device built in a hub member of a bicycle, which eliminates all the disadvantages of the prior art.

In order to accomplish this object, according to the present invention, there is provided a built-in generator arranged within a hub of a bicycle wheel, including a hub member rotatably fitted on an axle which is to be fixed to a frame of the bicycle, a stationary hollow cylinder fixed to the axle in the hub member, a generating coil unit provided in the stationary hollow cylinder and fixed thereto, a rotor formed integrally with a magnet rotatably provided on the axle, and a planetary transmission device for transmitting rotation of the hub member to the axle at increased speeds, wherein said planetary transmission device is formed of at least one planetary roller device comprising a sun roller integral with said magnet and rotatably provided on the axle, a plurality of planet rollers arranged to be circumscribed on the sun roller, a planet carrier rotatably supporting the planet rollers, and an elastic ring circumscribing on the planet rollers, said planet rollers being in pressure-contact with said elastic ring and said sun roller.

With the built-in generator of the present invention constructed as above, contact portions between the sun roller and the planet rollers and between the planet rollers and the elastic ring are always maintained in contact with each other under pressure. Therefore, when such planetary rollers are operated, frictional forces occur at the contact portions to drive the sun rollers, the planet rollers and the elastic ring. In the present invention, frictional forces resulting from the pressure contact forces caused by deformations of the elastic ring are previously set at values of a few times the torque required for generating electric power. Therefore, the planetary rollers can be operated under normal electric power generating conditions as a speed increasing transmission device no less effective than the hitherto used planetary gears.

Moreover, due to the arrangement wherein the sun rollers, the planet rollers and the elastic ring are always under a close contact condition, positional relations between the respective rollers are exactly maintained without any relative displacement.

As described above, furthermore, the respective rollers of the generator according to the present invention perform the rotating transmission with their smooth circumferential surfaces without any unevenness. Therefore, no noise occurs at contact portions even at high rotating speeds. Quiet rotation of parts in the generator takes place on generating electric power even on running of a bicycle at high speeds.

Moreover, the frictional forces caused by the pressure-contact between the rollers are previously set at values of three or four times the torque required for generating electric power. When the generator is acted upon by the torque in excess of the set value, the rollers slip at the contact portions so that no extra force acts on respective portions of the generator. Therefore, there is no risk of parts of the generator device being damaged.

With the above-mentioned built-in generator according to the present invention, the planet carrier and the rotor are provided rotatably on the axle and axially movable relative to the axle, respectively, and the rolling surfaces of the planet rollers are flat and smooth. Therefore, these members may shift in the axial direction so that side surfaces may be in contact with each other and forced to be slidingly rotated. If such is the case, the sliding rotation may result into frictional loss to lower the efficiency of the planetary speed increasing device. Moreover, the sliding rotation may cause wear of side surfaces of the parts so that durability of the device may be adversely affected.

Thus, in a preferred embodiment of the present invention, planet rollers are formed on their outer circumferential surfaces with tracks, and the sun roller and the elastic ring are formed with tracks on their circumferential surfaces rolling on the outer circumferential surfaces of the planet rollers so that the tracks of the planet rollers are fitted with the tracks of the sun roller and the elastic ring.

In another preferred embodiment of the present invention, the sun roller and the elastic ring are formed on their rolling surfaces with tracks in the form of concave grooves, instead of forming tracks on the circumferential surfaces of the planet rollers. The tracks formed on the sun roller and the elastic ring are fitted with edges of the planet rollers.

With this arrangement, the sun roller, the elastic ring and the planet rollers are snugly aligned with each other because of the fitted tracks when these rollers and the ring are assembled. The sun roller, the planet rollers and the elastic ring are all guided by the tracks, so as to prevent any axial shifting of these members. Therefore, by previously setting clearances between these members, they are prevented from slidingly rotating due to contact with each other.

The present invention will be more fully understood with reference to the following detailed specification and claims taken in conjunction with the appended drawings.

BRIEF DESCRIPTION OF THE DRAWINGS

FIG. 1 is a sectional view of one embodiment of the built-in generator according to the present invention;

FIG. 2 is an enlarged perspective view of a generating coil unit used in the generator according to the present invention;

FIG. 3 is an exploded perspective view, in an enlarged scale, of the generating coil unit shown in FIG. 2;

FIGS. 18, 19, 20 and 21 are sectional views illustrating modifications of the embodiment of FIGS. 14–17.

EXPLANATION OF THE PREFERRED EMBODIMENTS

Figure 4:
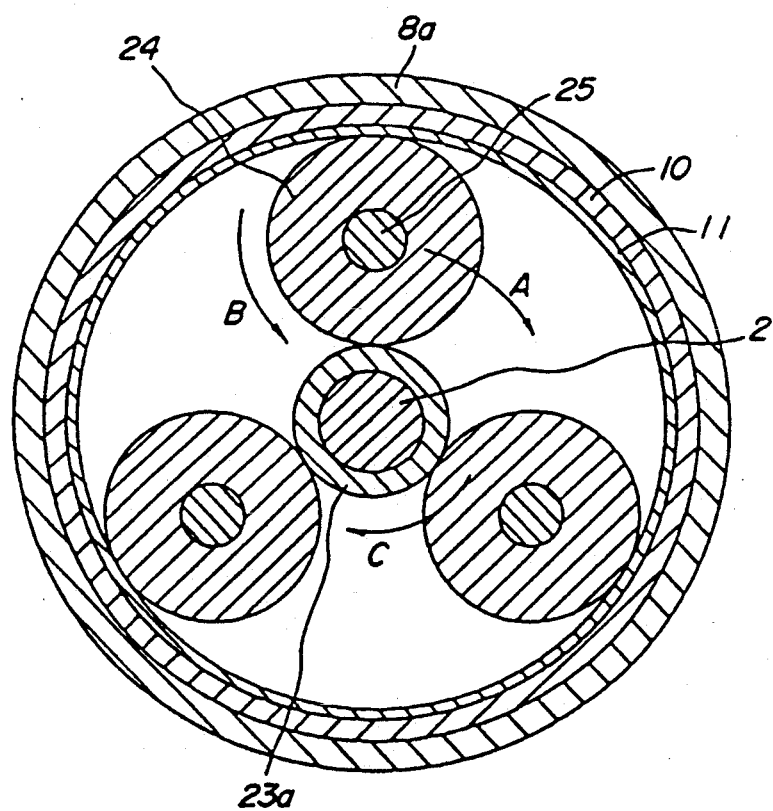
FIG. 4 is a sectional view explaining a first planetary roller series used in the generator shown in FIG. 1.

FIG. 1 illustrates front forks 1 constituting parts of a bicycle frame and a axle 2 extending between lower ends of the forks 1 and fixed thereto by means of nuts 3.

In this embodiment, a hub member 4 of a front wheel is formed in a hollow cylindrical body having an open end (on the left side in FIG. 1). A closure member 5 is threadedly connected to the open end of the hub member 4. The assembly of the closure member 5 and the hub member 4 is rotatably provided on the axle 2 through ball bearings 6.

The open end of the hub member 4 forms an enlarged diameter portion 4a. Spokes 7 of the front wheel are connected to the hub member 4.

In the hub member 4 there is provided a stationary hollow cylinder 8 whose one end (right end in FIG. 1) is fitted on the axle 2 and fixed thereto by means of a key 9 and the other end (left end) is opened and forms an enlarged diameter portion 8a. On an inner circumference of the enlarged diameter portion 8a is provided a retainer ring 10 made of an elastic material, such as rubber. On an inner circumference of the retainer ring 10 are provided first and second elastic rings 11, 12 both made of a spring steel or the like, and a spacer 13 embraced therebetween. Moreover, a corner ring 14 is provided at a corner of the inner circumference of the enlarged diameter portion 8a on right side of the second elastic ring 12 viewed in FIG. 1.

The axle 2 is formed with a shoulder 2a to form a reduced diameter portion, and a groove 2b serving as a key way while allowing introduction of a lead wire. A washer 15 is provided on the reduced diameter portion of the axle 2 and urged against the stationary hollow cylinder 8 by a spring 16.

As clearly shown in FIG. 3, a lead wire 17b is wound around a grooved ring 17a to form a coil 17. Strip-shaped pole shoes 18a are arranged respectively at equi-angularly spaced four positions on outer circumference of a cylinder. These strip-shaped pole shoes 18a are connected to a small diameter cylinder 18b to form a first armature 18 in a unitary body. The cylinder 18b of the first armature 18 is inserted into a center hole 17c of the coil 17 in such a manner that the end of the cylinder 18b of the first armature 18 projects somewhat from the center hole 17c. A cylinder 19b surrounding the extended end of the cylinder 18b of the first armature 18 is connected to four strip-shaped pole shoes 19a to form a second armature 19 in a unitary body. When assembled, the four pole shoes 19a are positioned alternately with the four first pole shoes 18a. The second armature 19 is fitted onto the assembly of the coil 17 and first armature 18 to form a generating coil unit 20 in a unitary body as shown in FIG. 2. Reference numeral 21 denotes the lead wire extending from the coil 17.

The generating coil unit 20 is inserted between the stationary hollow cylinder 8 and the axle 2 and fixed therebetween, while the lead wire 21 is led through an aperture 8b formed in the stationary hollow cylinder 8 and the groove 2b of the axle 2 out of the hub assembly.

A magnet 22a is joined with a second sun roller 22b to form a rotor 22 in a unitary body. The rotor 22 is rotatably arranged on the axle 2 in such a manner that the magnet 22a is in facing relation to the pole shoes 18a and 19a of the generating coil unit 20.

Figure 5:
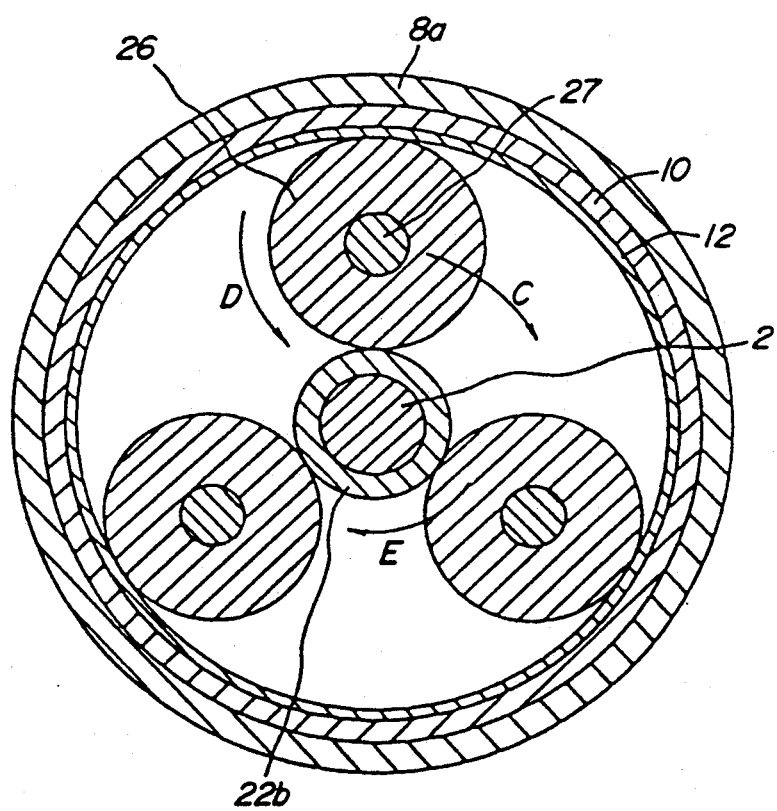
FIG. 5 is a sectional view explaining a second planetary roller series used in the generator shown in FIG. 1.

A first sun roller 23a and a planet carrier 23 in a form of a disc are formed in an integral body. The planet carrier 23 is rotatably provided on the axle 2 between the rotor 22 and the closure member 5 of the hub member 4. Three first planet rollers 24 are rotatably supported on the closure member 5 by means of pins 25 arranged in a circle in a such manner that the first planet rollers 24 are arranged around the first sun roller 23a (FIG. 4). Similarly, three second planet rollers 26 are rotatably supported on the planet carrier 23 by means of pins 27 arranged in a circle in such a manner that the second planet rollers 26 are arranged around the second sun roller 22b (FIG. 5).

The first elastic ring 11 has an inner diameter which is somewhat smaller than the diameter of a circle on which the first planet rollers 24 are inscribed. The first elastic ring 11 with the smaller inner diameter is press-fitted on the first planet rollers 24 so that the first planet rollers 24 are in pressure-contact with the first sun roller 23a. Similarly, the second elastic ring 12 has an inner diameter which is somewhat smaller than the diameter of a circle on which the second planet rollers 26 are inscribed. The second elastic ring 12 with the smaller inner diameter is press-fitted on the second planet rollers 26 so that the second planet rollers 26 are in pressure-contact with the second sun roller 22b.

The operation of the generator thus constructed according to the present invention will be explained hereinafter.

When the bicycle equipped with the generator runs, the hub member 4 integral with the front wheel is rotated together with the closure member 5 and the pins 25 in a direction shown by an arrow A in FIG. 4. In this case, as the stationary hollow cylinder 8 is fixed to the axle 2, the first planet rollers 24 are rotated in directions shown by an arrow B about their axes upon revolution of the first planet rollers 24 about the first sun roller 23a in the direction A. Owing to the revolution of the first planet rollers 2 in the direction A and the rotation of the same in the direction B, the first sun roller 23a in rolling-contact with the first planet rollers 24 is rotated at an increased rotating speed in a direction shown by an arrow C in FIG. 4. In this embodiment, the inner diameter of the first elastic ring 11 in the stationary hollow cylinder 8 is 64 mm, and the outer diameter of the first sun roller 23a is 16 mm. Therefore, the planet carrier 23 integral with the first sun roller 23a is rotated at a speed of five times the rotational speed of the hub member 4 because of $(64+16) \div 16 = 5$.

Moreover, when the planet carrier 23 integral with the first sun gear 23a is rotated in the direction C, the pins 27 are also rotated in the same direction as shown in FIG. 5. Therefore, the second planet rollers 26 are revolved about the second sun roller 22b in the direction C and rotated about their axes in a direction shown by an arrow D. Accordingly, the second sun roller 22b in rolling-contact with the second planet rollers 26 is rotated in a direction shown by an arrow E at an increased rotating speed. In this embodiment, the inner diameter of the second elastic ring 12 in the stationary hollow cylinder 8 is 64 mm, and the outer diameter of the second sun roller 22b is 16 mm. Therefore, the rotor 22 integral with the second sun roller 22b is rotated at a speed of five times the rotational speed of the planet carrier 23 because of $(64+16) \div 16 = 5$.

Accordingly, the rotor 22 is rotated at an increased speed of twenty-five ($5 \times 5$) times the rotational speed of the hub member 4 with the aid of the first planet roller series (5, 24, 23a) and the second planet roller series (23, 26, 22b). Although two series of the planet rollers have been explained with reference to the above-mentioned embodiment, one series of the planet rollers or three series of the planet rollers may be applicable to the present invention.

Figure 6:
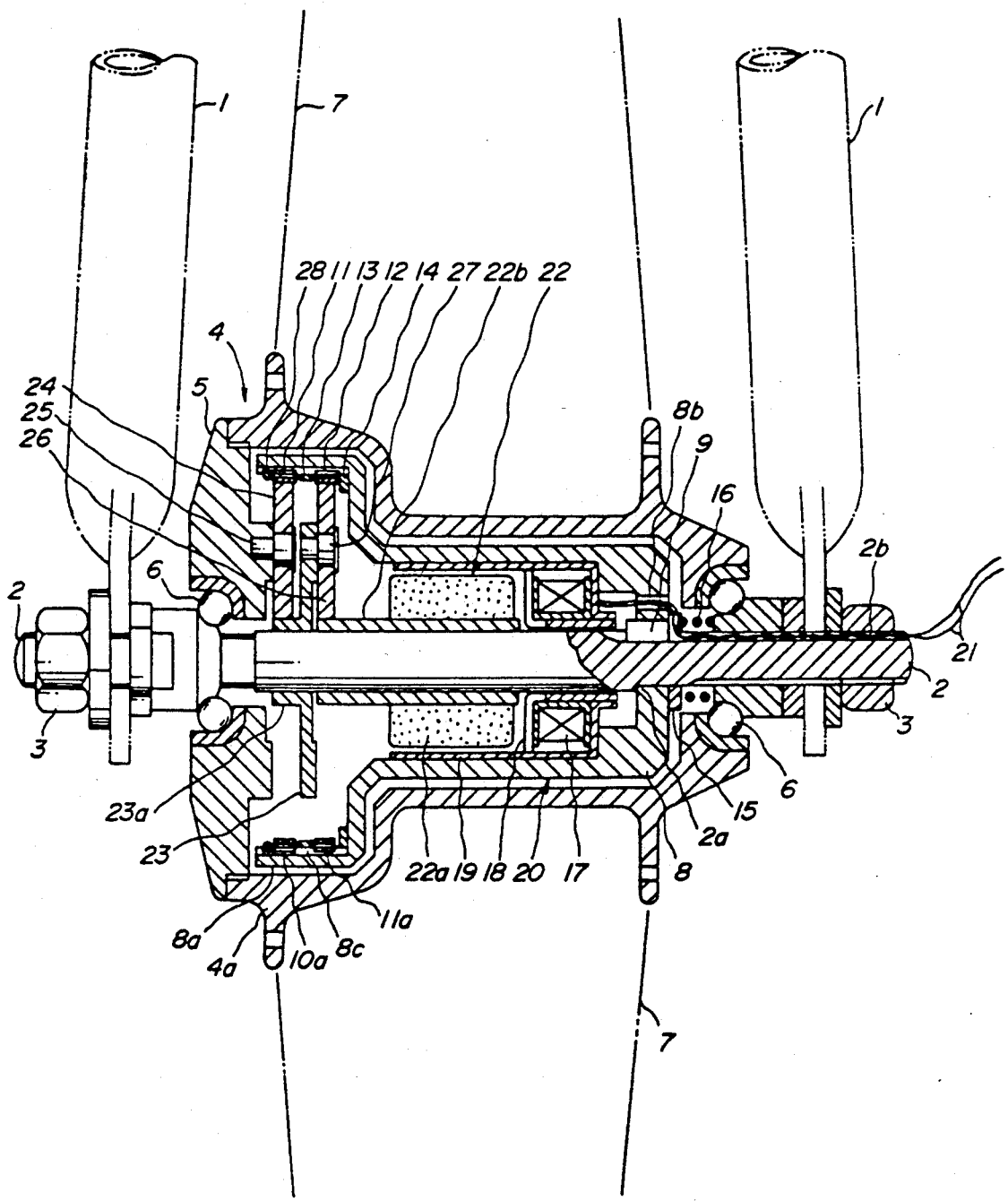
FIG. 6 is a sectional view of another embodiment of the generator according to the present invention.
Figure 7:
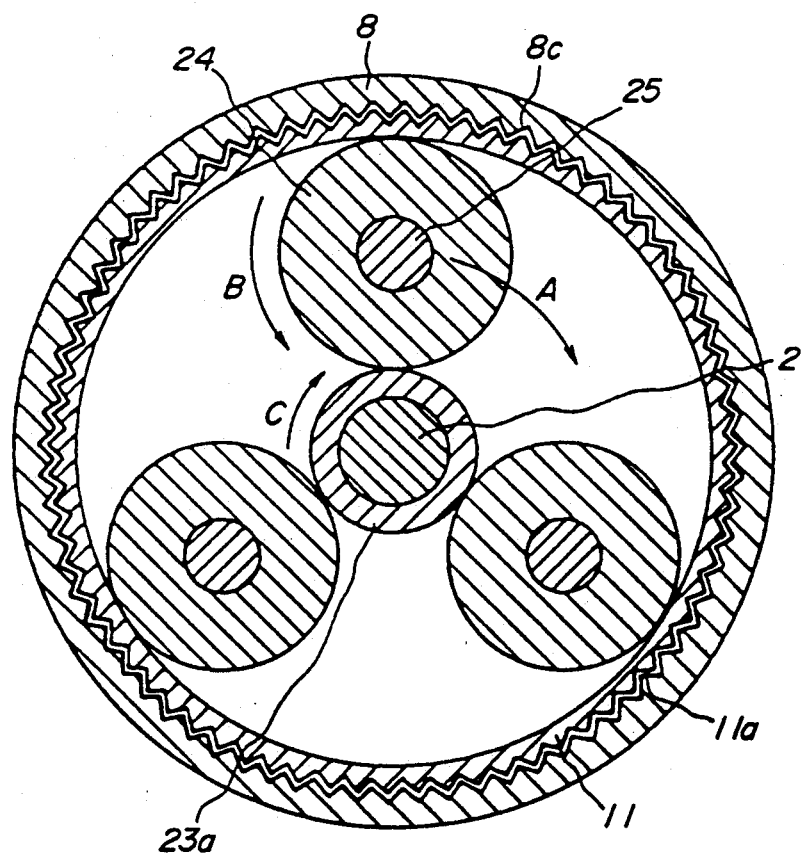
FIG. 7 is a sectional view explaining a first planetary roller series used in the generator shown in FIG. 6.
Figure 8:
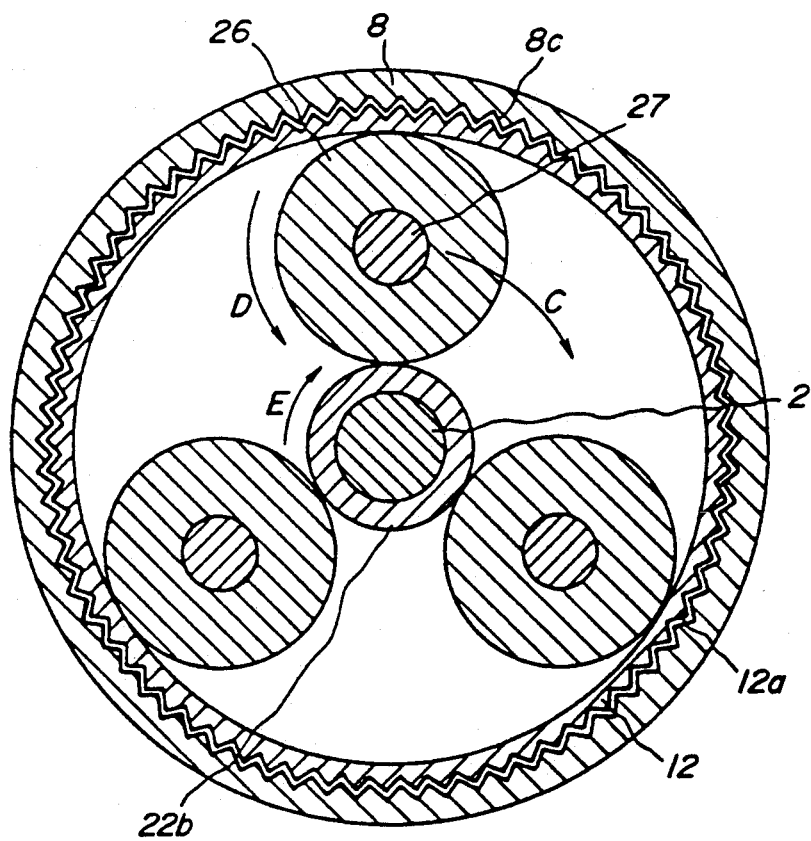
FIG. 8 is a sectional view explaining a second planetary roller series used in the generator shown in FIG. 6.
Figure 9:
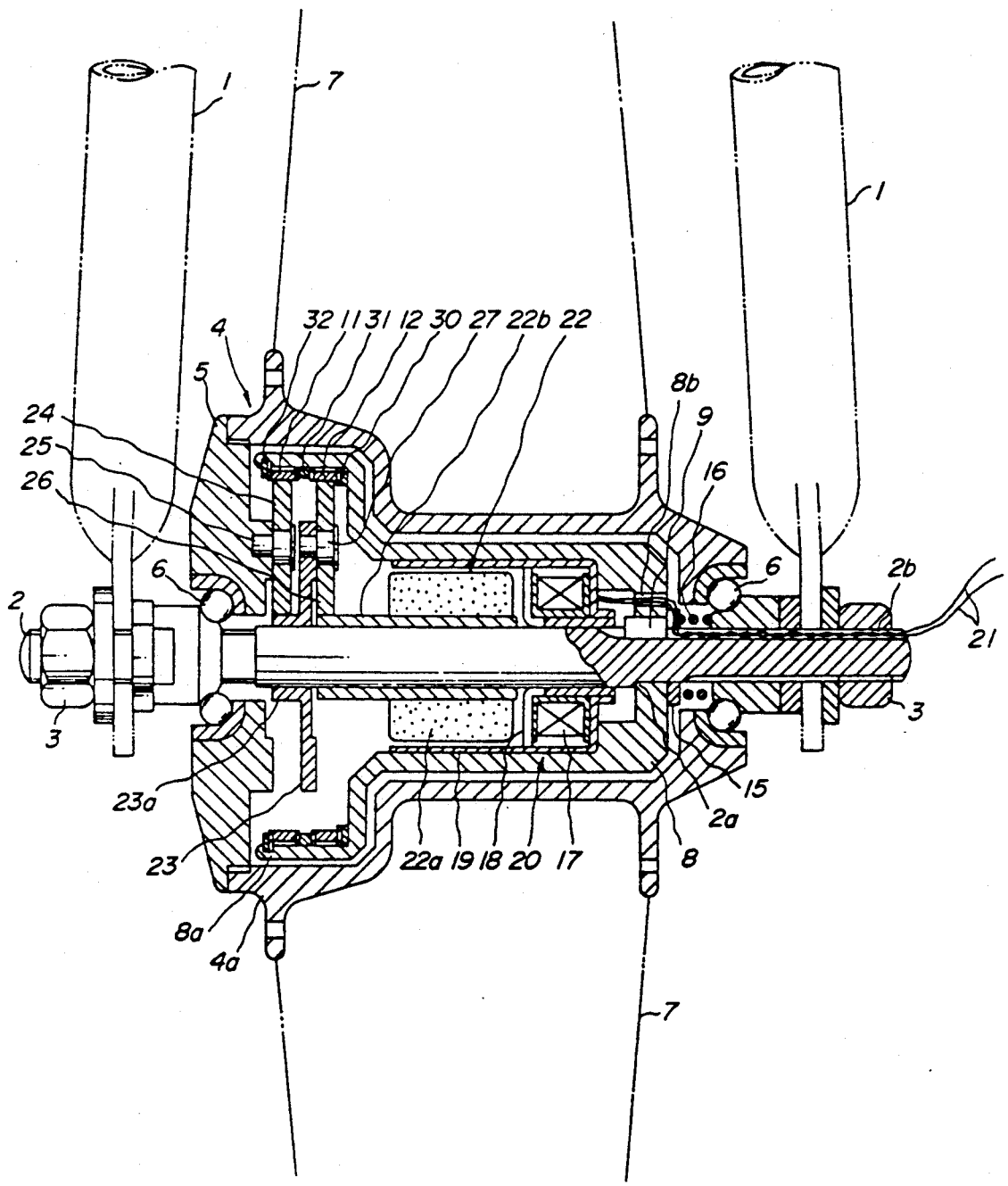
FIG. 9 is a sectional view of a further embodiment of the generator according to the present invention.

FIGS. 6, 7 and 8 illustrate another embodiment of the invention, wherein like components are designated by the same reference numerals as those in the first embodiment.

As this embodiment is substantially similar to the first embodiment, only different features will be explained below. There is provided a stationary hollow cylinder 8 whose on end (right end in FIG. 6) is fitted on an axle 2 and fixed thereto by means of a key 9 and the other end (left end) is opened forming an enlarged diameter portion 8a. The stationary hollow cylinder 8 is formed on its inner circumference with an internal gear 8c.

A first elastic ring 11 is formed with external gear teeth 11a to be loosely fitted with the internal gear 8c of the stationary hollow cylinder 8, and a second elastic ring 12 is formed with external gear teeth 12a to be loosely fitted with the internal gear 8c. In other words, pitch diameter of the external gear teeth 11a and 12a are slightly smaller than the pitch diameter of the internal gear 8c. The first and second elastic rings 11 and 12 are loosely fitted in the enlarged diameter portion 8a with the external gear teeth 11a and 12a fitted with the internal gear 8c. An annular spacer 13 is provided between the first and second elastic rings 11 and 12. Moreover, a corner ring 14 is provided at a corner of the inner circumference of the enlarged diameter portion 8a on right side of the second elastic ring 12 viewed in FIG. 6. Reference numeral 28 denotes a snap ring on the outer side of the first elastic ring 11.

A generating coil unit 20 and a rotor 22 are constructed in the same manner as in the first embodiment.

A first sun roller 23a and a planet carrier 23 in the form of a disc are formed in an integral body as in the same manner in the first embodiment. The planet carrier 23 is rotatably provided on the axle 2 between the rotor 22 and a closure member 5 of the hub member 4. Three first planet rollers 24 are rotatably supported on the closure member 5 by means of pins 25 arranged in a circle such that the first planet rollers 24 are arranged around the first sun roller 23a (FIG. 7). Similarly, three second planet rollers 26 are rotatably supported on the planet carrier 23 by means of pins 27 arranged in a circle such that the second planet rollers 26 are arranged around the second sun roller 22b (FIG. 8).

The first elastic ring 11 has an inner diameter which is somewhat smaller than the diameter of a circle on which the first planet rollers 24 are inscribed. The first elastic ring 11 with the smaller inner diameter is press-fitted on the first planet rollers 24 so that the first planet rollers 24 are in pressure-contact with the first sun roller 23a. Similarly, the second elastic ring 12 has an inner diameter which is somewhat smaller than the diameter of a circle on which the second planet rollers 26 are inscribed. The second elastic ring 12 with the smaller inner diameter is press-fitted on the second planet rollers 26 so that the second planet rollers 26 are in pressure-contact with the second sun roller 22b.

The first and second elastic rings 11, 12 are made of a spring steel or the like, so that these elastic rings 11 and 12 are deformed on press-fitting. However, such deformations are taken up by clearances between teeth of the internal gear 8c and the external gear teeth 11a and 12a.

The built-in generator of this embodiment operates in the same manner as that of the first embodiment. Namely, the inner diameter of the first elastic ring 11 in the stationary hollow cylinder 8 is 64 mm, and the outer diameter of the first sun roller 23a is 16 mm. The planet carrier 23 is rotated at a speed of five times the rotational speed of the hub member 4. Moreover, the inner diameter of the second elastic ring 12 in the stationary hollow cylinder 8 is 64 mm, and the outer diameter of the second sun roller 22b is 16 mm. The rotor 22 is rotated at a speed of five times the rotational speed of the planet carrier 23. Therefore, the rotor 22 is rotated at an increased speed of twenty-five times the rotational speed of the hub member 4.

FIGS. 9-13 illustrate a further embodiment of the built-in generator according to the present invention. Different parts from those of the first embodiment will be explained below.

Figure 10:
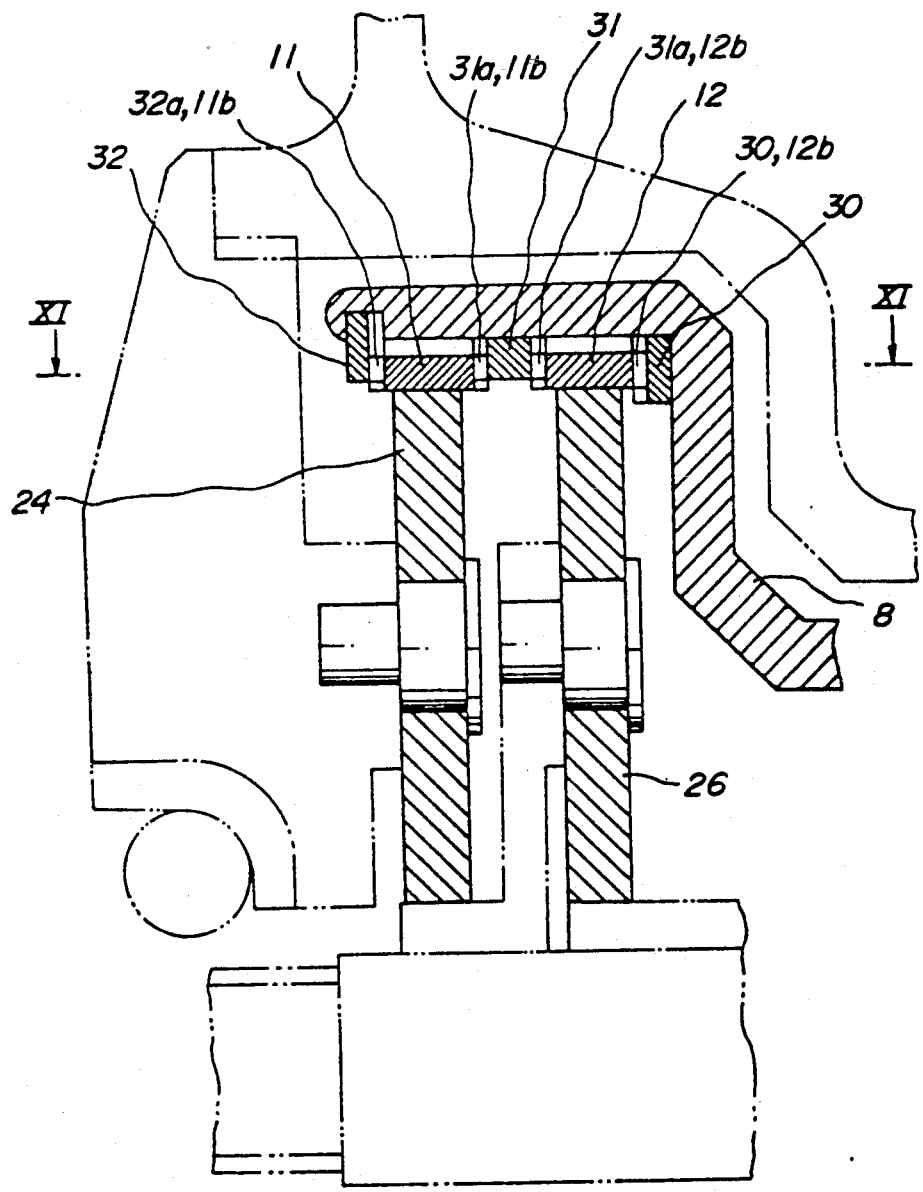
FIG. 10 is a sectional view, in an enlarged scale, illustrating essential parts in the generator shown in FIG. 9.
Figure 11:
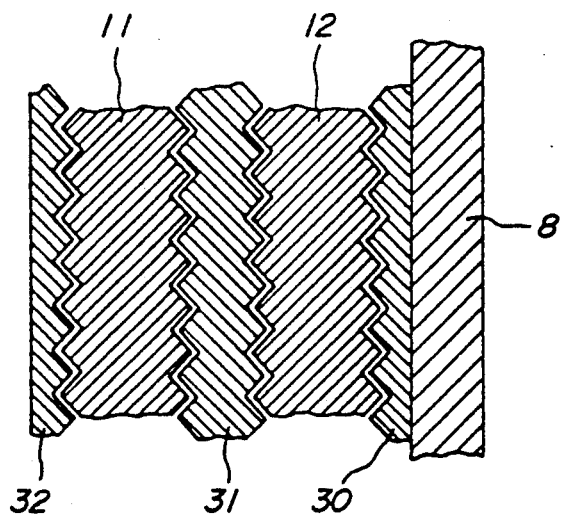
FIG. 11 is a sectional view taken along the line XI—XI in FIG. 10.
Figure 12:
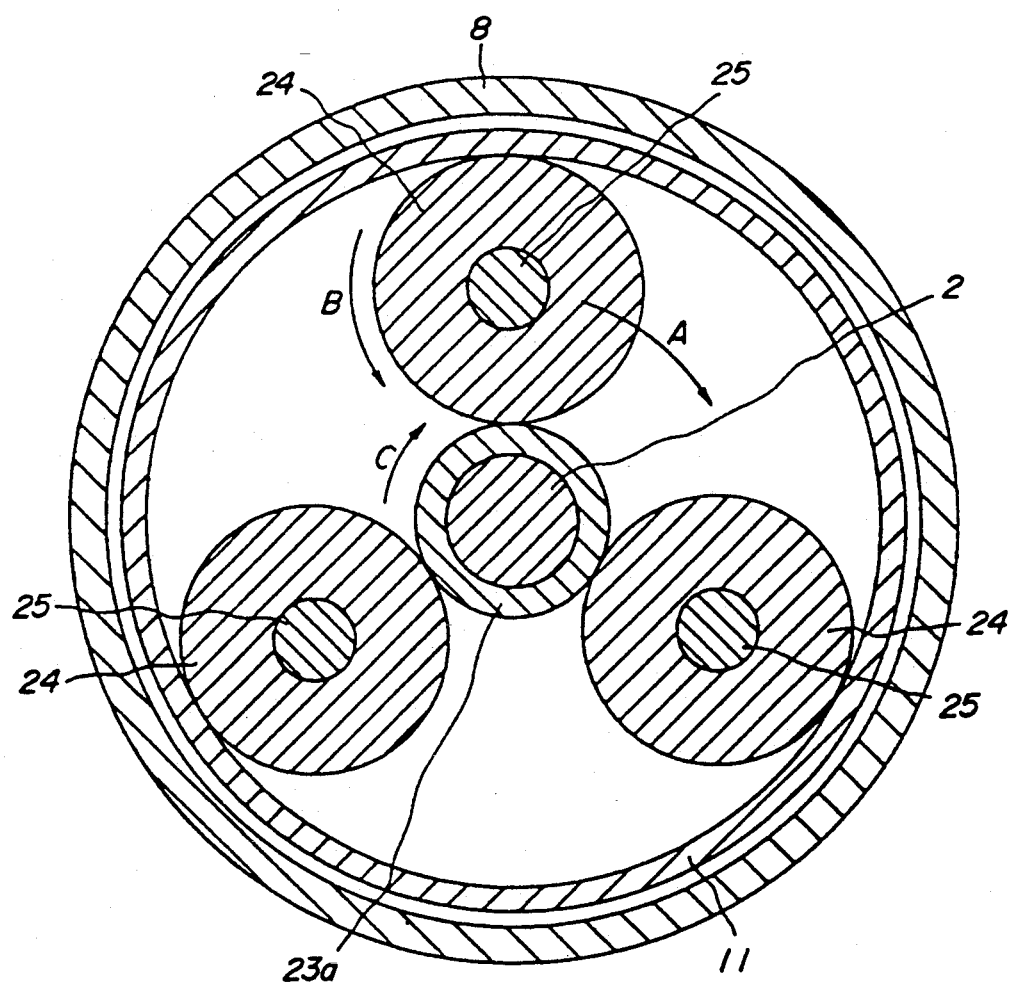
FIG. 12 is a sectional view explaining a first planetary roller series used in the generator shown in FIG. 9.
Figure 13:
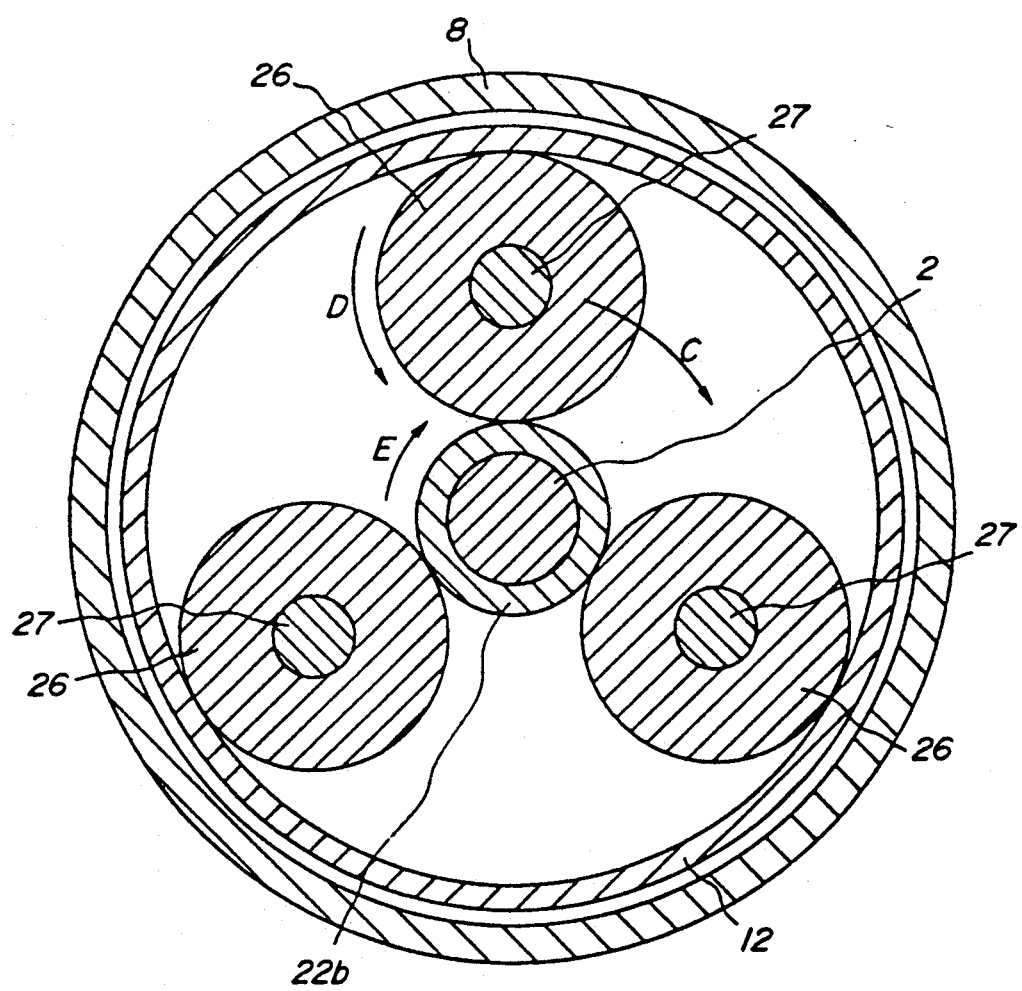
FIG. 13 is a sectional view explaining a second planetary roller series used in the generator shown in FIG. 9.
Figure 14:
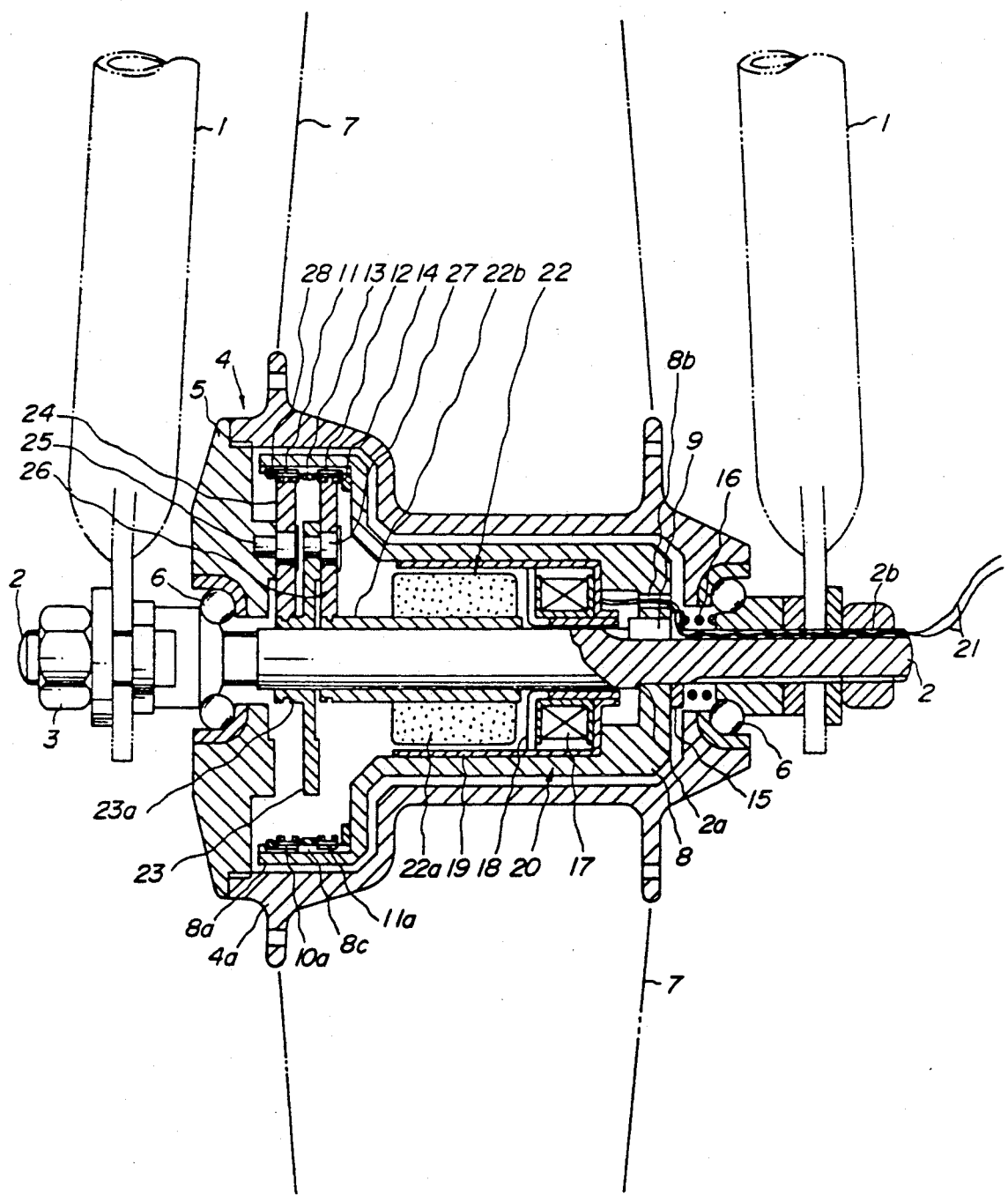
FIG. 14 is a sectional view of still another embodiment of the generator according to the present invention.

A toothed ring 30 formed on its one side with side teeth 30a is fixed to the right corner of the inner circumference of an enlarged diameter portion 8a of a stationary hollow cylinder 8, such that the side teeth 30a are directed to the left viewed in FIG. 10. A toothed ring 31 formed on both sides with side teeth 31a is fixed to the center of the inner circumference of the enlarged diameter portion 8a. Moreover, a toothed fixed to the left end of the inner circumference of the enlarged diameter portion 8a such that the side teeth 32a are directed to the right viewed in FIG. 10.

Further, between the toothed rings 31 and 32 is loosely fitted a first elastic ring 11 formed on its both sides with side teeth 11b, so that the side teeth 11b of the first elastic ring 11 are fitted with the side teeth 31a on the right side and with the side teeth 32a on the left side viewed in FIG. 10. Likewise, between the toothed rings 30 and 31 is loosely fitted a second elastic ring 12 formed on its both sides with side teeth 12b, so that the side teeth 12b are fitted with the side teeth 30a on the right side and with the side teeth 31a on the left side in FIG. 10. Therefore, even if the first and second elastic rings 11 and 12 are loosely fitted between the toothed rings, respectively, there is no longer any risk of the elastic rings being rotatively slipped relative to the stationary hollow cylinder 8.

A generating coil unit 20 and a rotor 22 are constructed in the same manner as in the above embodiments. Moreover, first planet roller series 5, 24 and 23a and second planet roller series 23, 26 and 22b are also constructed in the same manner in the above embodiments.

The first elastic ring 11 has an inner diameter which is somewhat smaller than the diameter of a circle on which the first planet rollers 24 are inscribed. The first elastic ring 11 with the smaller inner diameter is press-fitted on the first planet rollers 24 so that the first planet rollers 24 are in pressure-contact with a first sun roller 23a. Similarly, the second elastic ring 12 has an inner diameter which is somewhat smaller than the diameter of a circle on which the second planet rollers 26 are inscribed. The second elastic ring 12 with the smaller inner diameter is press-fitted on the second planet rollers 26 so that the second planet rollers 26 are in pressure-contact with a second sun roller 22b.

The first and second elastic rings 11, 12 are made of a spring steel or the like, so that these elastic rings 11, 12 are deformed on press-fitting. However, such deformations are taken up by clearances between the inner circumference of the enlarged diameter portion 8a and outer circumferences of the first and second elastic rings 11 and 12.

The built-in generator of this embodiment operates in the same manner as that of the first and second embodiments. Namely, the inner diameter of the first elastic ring 11 is 64 mm, and the outer diameter of the first sun roller 23a is 16 mm. The planet carrier 23 is rotated at a speed of five times the rotational speed of the hub member 4. Moreover, the inner diameter of the second elastic ring 12 is 64 mm, and the outer diameter of the second sun roller 22b is 16 mm. The rotor 22 is rotated at a speed of five times the rotational speed of the planet carrier 23. Therefore, the rotor 22 is rotated at an increased speed of twenty-five times the rotational speed of the hub member 4.

FIGS. 14-17 illustrate a further embodiment of the built-in generator according to the present invention. In comparison of FIG. 14 with FIG. 6, this embodiment seems to be similar to the second embodiment. However, the elastic rings 11, 12 and the planet rollers 24, 26 are different from those of the second embodiment, as clearly shown in FIGS. 15-21.

The stationary hollow cylinder 8 is formed on its inner circumference with an internal gear 8c in the same manner as in the second embodiment.

Figure 15:
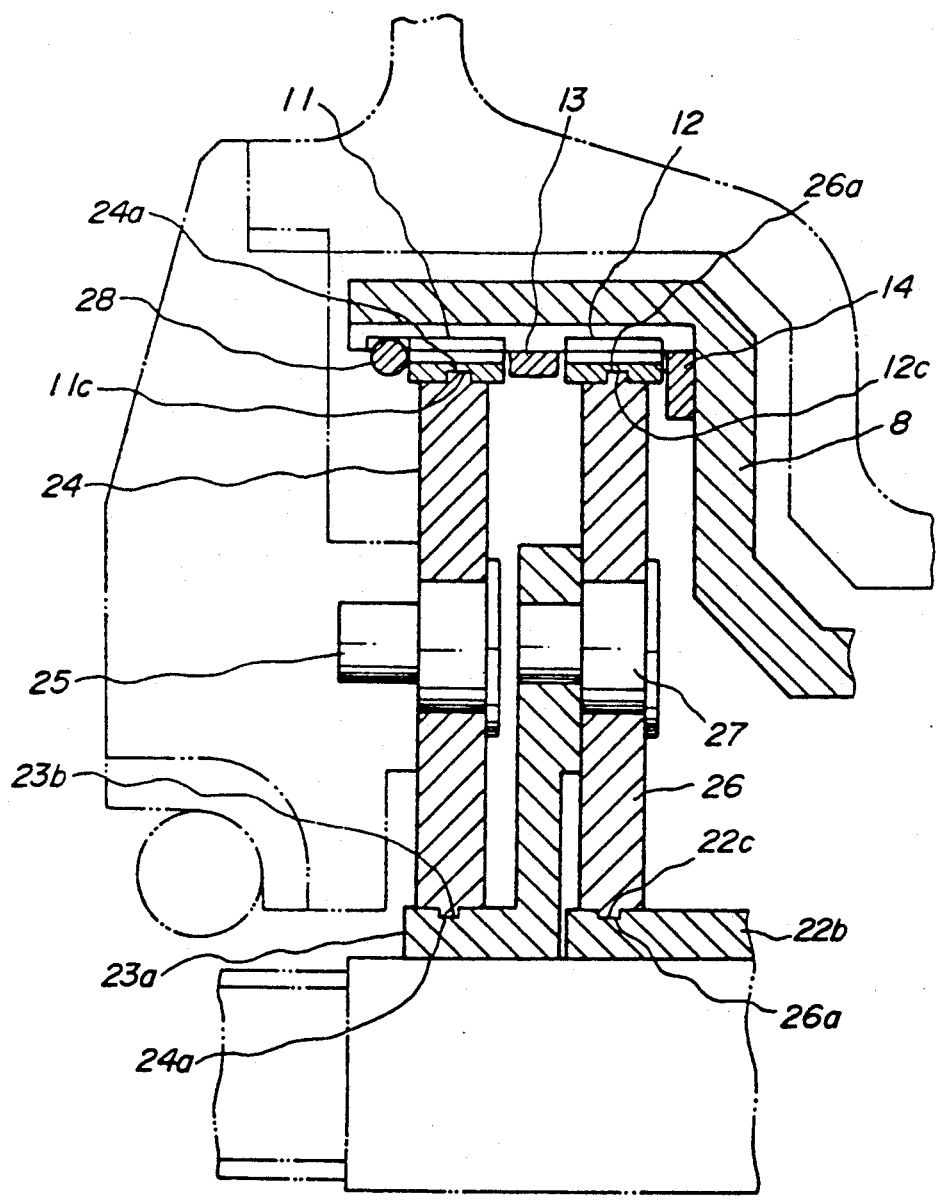
FIG. 15 is a sectional view, in an enlarged scale, illustrating essential parts in the generator shown in FIG. 14.

The first and second elastic rings 11, 12 are formed on their outer circumferences with external gear teeth 11a, 12a, respectively, whose pitch diameters are slightly smaller than that of the internal gear 8c of the stationary hollow cylinder 8. Moreover, the first and second elastic rings 11, 12 are formed on their inner circumferences with tracks 11c, 12c groove-shaped in section, respectively, along the whole circumferences at the center of their widths (FIG. 15).

Figure 16:
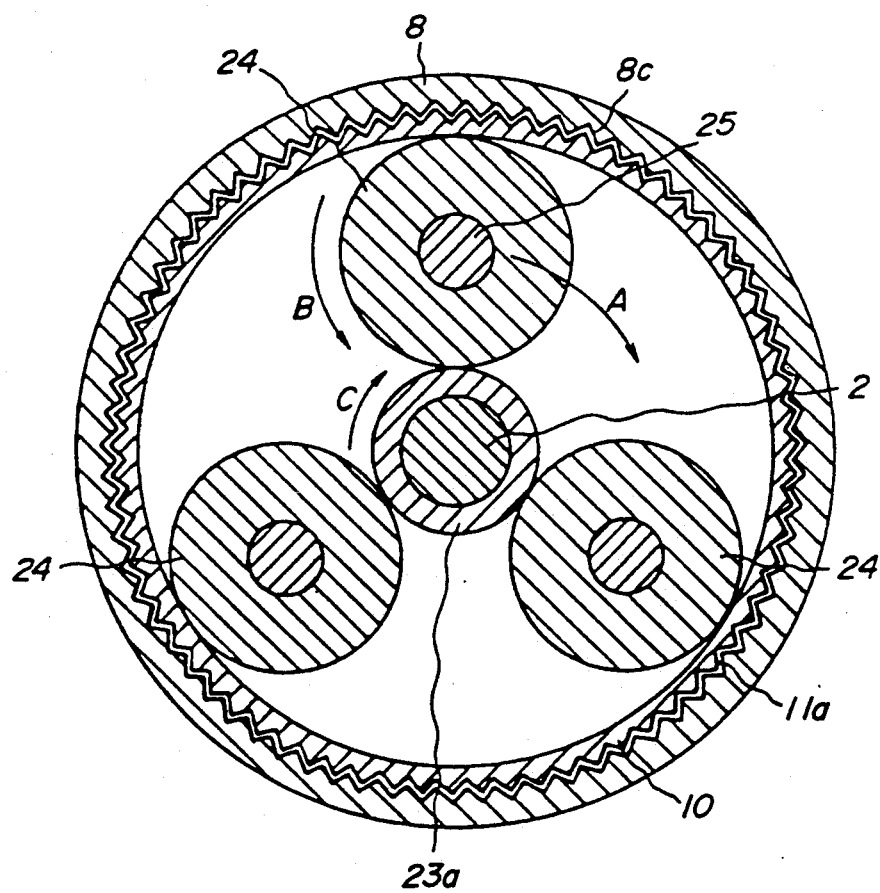
FIG. 16 is a sectional view explaining a first planetary roller series used in the generator shown in FIG. 14.
Figure 17:
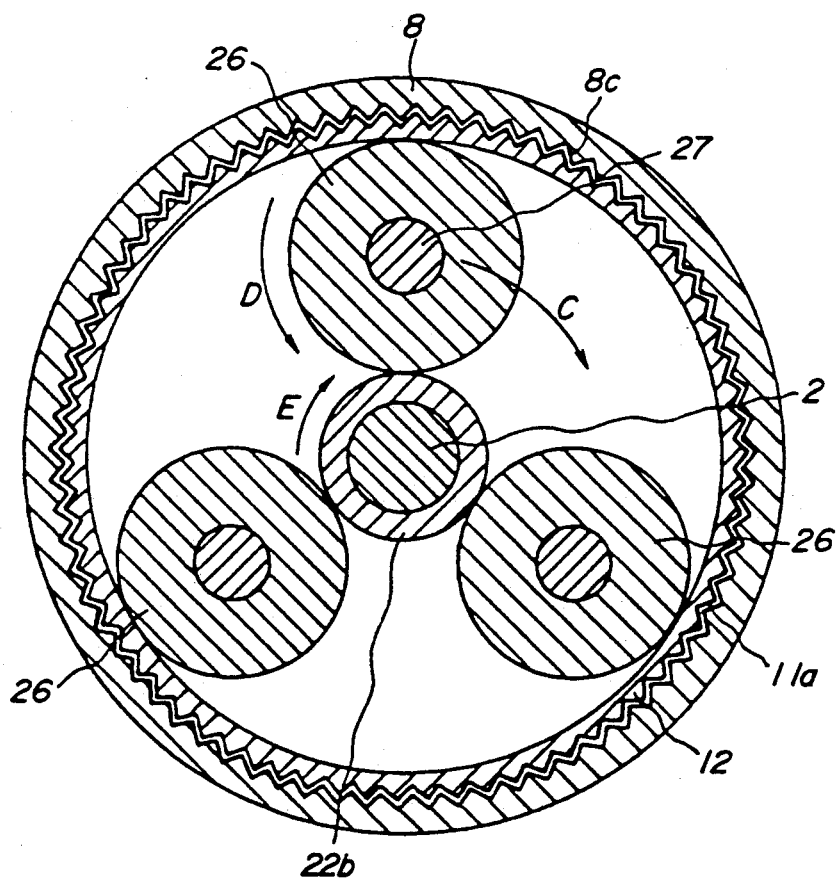
FIG. 17 is a sectional view explaining a second planetary roller series used in the generator shown in FIG. 14.

The first and second elastic rings 11, 12 and the annular spacer 13 therebetween are arranged on the inner circumference of the enlarged diameter portion 8a, so that the external gear teeth 11a, 12a are brought into fitted with the internal gear 8c of the enlarged diameter portion 8a in a loosely fitted condition (FIGS. 16 and 17). Moreover, the corner ring 14 is provided at a right corner of the inner circumference of the second elastic ring 12 viewed in FIG. 15. Reference numeral 28 denotes a snap ring.

The generating coil unit 20 and the rotor 22 are constructed in the same manner as in the above embodiments. Moreover, the first planet roller series 5, 24 and 23a and the second planet roller series 23, 26 and 22b are also constructed in the same manner in the above embodiments.

The first elastic ring 11 has an inner diameter which is somewhat smaller than the diameter of a circle on which the first planet rollers 24 are inscribed. The first elastic ring 11 with the smaller inner diameter is press-fitted on the first planet rollers 24 so that the first planet rollers 24 are in pressure-contact with a first sun roller 23a. Similarly, the second elastic ring 12 has an inner diameter which is somewhat smaller than the diameter of a circle on which the second planet rollers 26 are inscribed. The second elastic ring 12 with the smaller inner diameter is press-fitted on the second planet rollers 26 so that the second planet rollers 26 are in pressure-contact with a second sun roller 22b.

As shown in FIG. 15, according to this embodiment, the first planet rollers 24 are formed on their outer circumferences with tracks 24a in the form of a rectangular ridge extending in the circumferential direction. The second planet rollers 26 are also formed on their outer circumferences with tracks 26a in the form of a rectangular ridge extending in the circumferential direction.

Moreover, the first elastic ring 11 is formed on its inner circumferential surface with a track 11c in the form of a rectangular groove to be fitted with the tracks 24a of the first planet rollers 24, while the first sun roller 23a is formed on its outer circumferential surface with a track 23b in the form of a rectangular groove to be fitted with the tracks 24a of the first planet rollers 24. Similarly, the second elastic ring 12 is formed on its inner circumferential surface with a track 12c in the form of a rectangular groove to be fitted with the tracks 26a of the second planet rollers 24, while the second sun roller 22b is formed on its outer circumferential surface with a track 22c in the form of a rectangular groove to be fitted with the tracks 26a of the second planet rollers 26.

Figure 18:
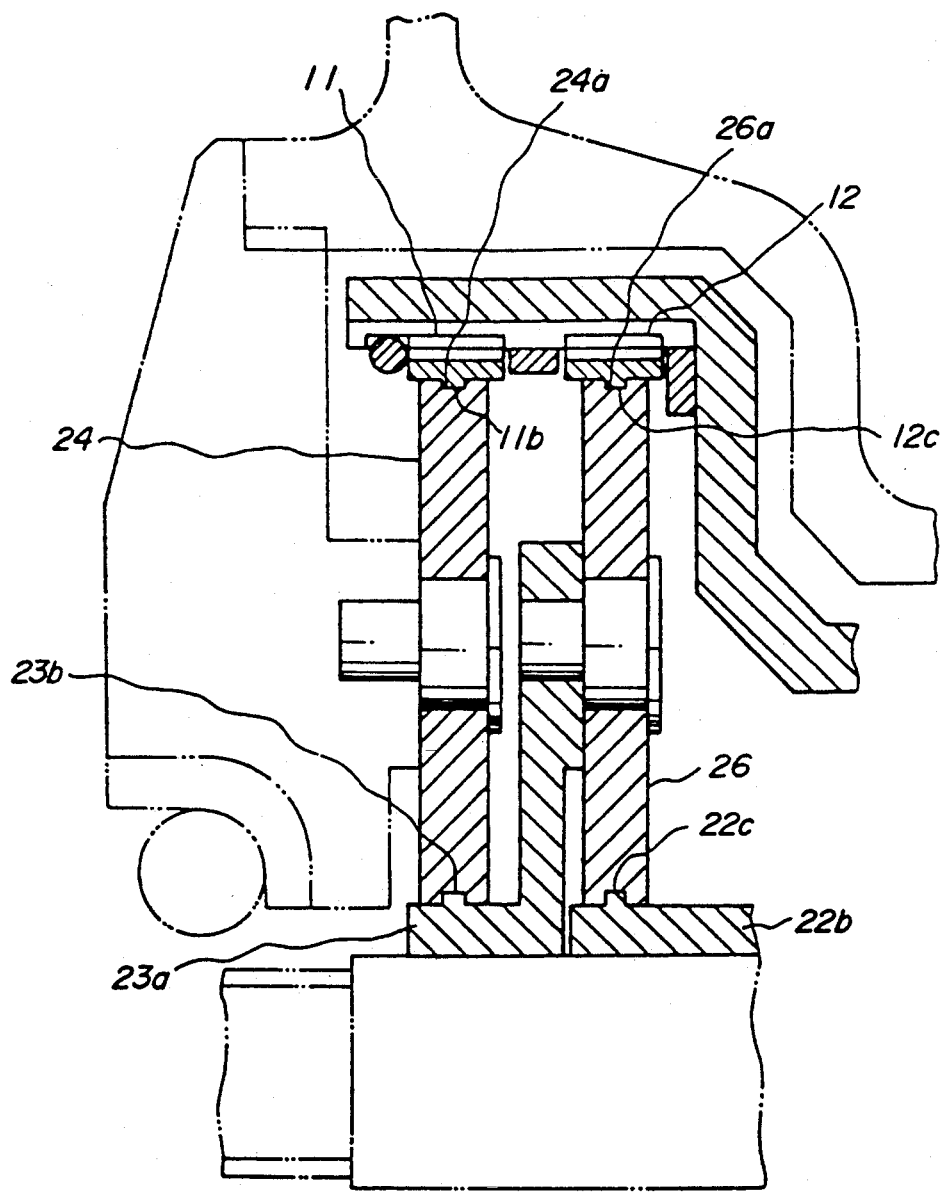

FIG. 18 illustrates a first modification of the embodiment of FIGS. 14–17. In this case, the planet rollers 24, 26 are formed on their outer circumferential surfaces with tracks 24b, 26a in the form of rectangular grooves, while tracks 11c, 23b; 12c, 22c to be fitted with the tracks 24a, 26a are formed in the form of rectangular ridges.

Figure 19:
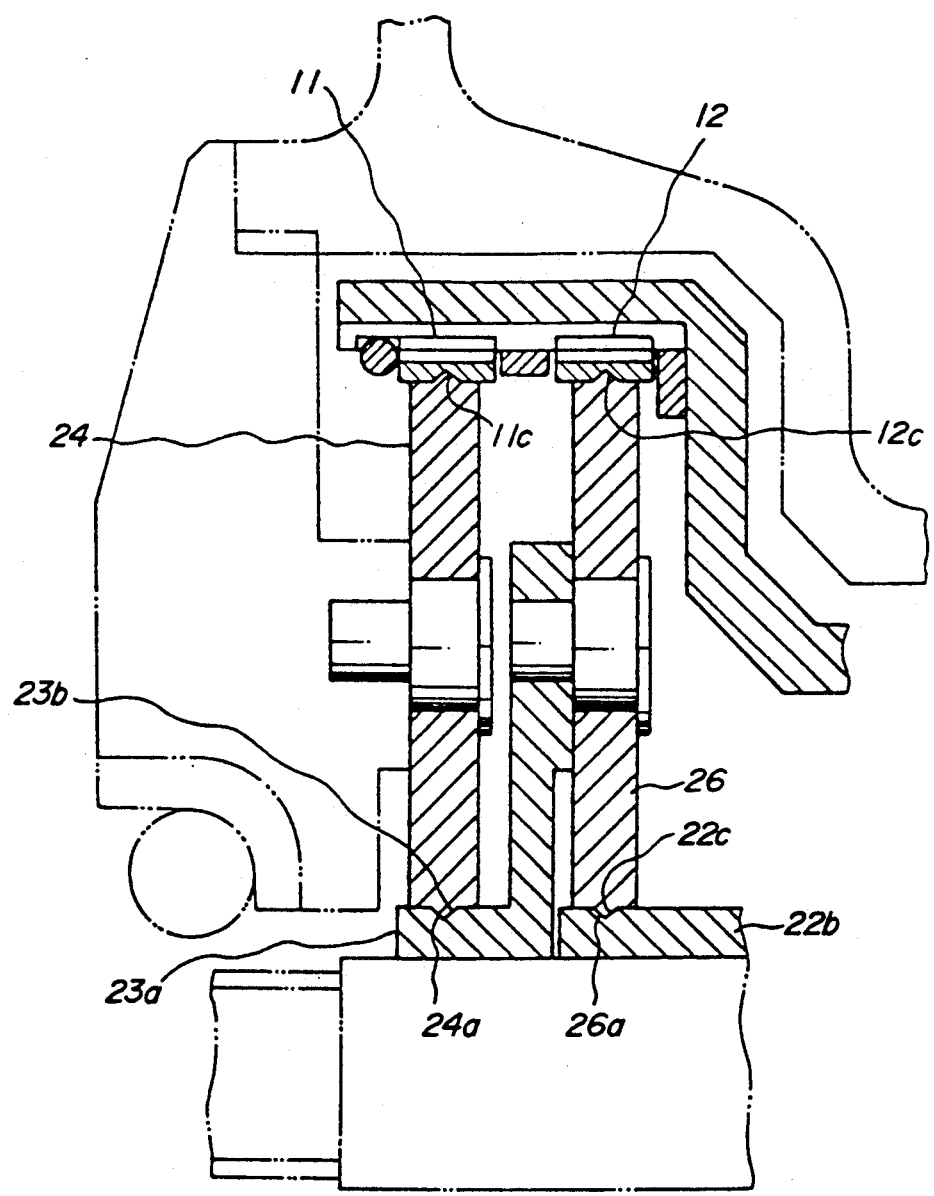

FIG. 19 illustrates a second modification of the embodiment of FIGS. 14–17, in which the tracks 24a, 26a on the outer circumferential surfaces of the planet rollers 24, 26 are formed in triangular ridges, while the tracks 11c, 23b; 12c, 22c to be fitted with the tracks 24a, 26a are formed in triangular grooves.

Figure 20:
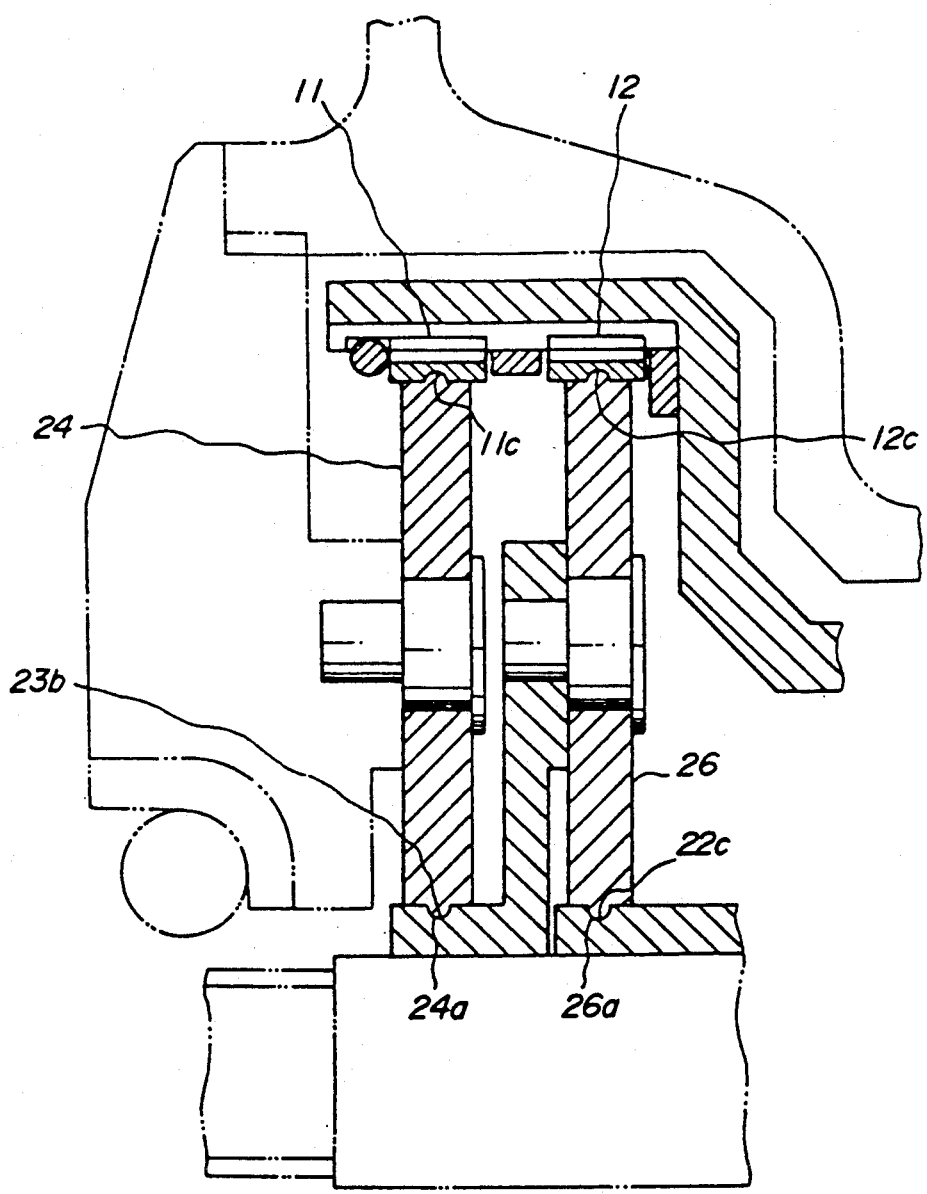

FIG. 20 illustrates a third modification of the embodiment of FIGS. 14–17, in which the tracks 24a, 26a of the planet rollers 24, 26 are in the form of semicircular ridges, and the tracks 11c, 23b; 12c, 22c to be fitted with the tracks 24a, 26a are in the form of semicircular grooves.

Moreover, FIG. 21 illustrates a further modification of the embodiment of FIGS. 14–17. In this case, the first and second planet roller 24, 26 do not have any tracks such as those described above, while the first and second sun rollers 23a, 22b and the first and second elastic rings 11, 12 are formed in their rolling circumferential surfaces with tracks 11c, 23b; 12c, 22c in the form of concave grooves to be fitted with the edges of the planet rollers 24, 26.

In press-fitting the first and second elastic rings 11 and 12, the above-mentioned respective tracks may impede smooth press-fitting. However, the elastic rings are thin and made of a material such as a spring steel so that they can be readily deformed to aid in press-fitting these members. Moreover, there are moderate clearances at fittings between the planet rollers 24, 26 and pins 25, 27 supporting them to permit the planet rollers 24, 26 to deflect outwardly. There is no obstruction for the assembly.

Although the first and second elastic rings 11, 12 have been slightly deformed in triangular shapes after the assembly, such deformations can be taken up by the clearances between the internal gear 8c of the enlarged diameter portion 8a and the external gear teeth 11a and 12a.

With the above-mentioned arrangement of the embodiment of FIGS. 14–17 and the modifications of FIGS. 18–21, the first and second planet roller series (5, 24, 23a and 23, 26, 22b) are operated in the same manner as the first to third embodiments.

In this case also, the inner diameter of the first elastic ring 11 is 64 mm, and the outer diameter of the first sun roller 23a is 16 mm. Therefore, the planet carrier 23 integral with the first sun roller 23a is rotated at a speed of five times the rotational speed of the hub member 4 because of $(64+16) \div 16 = 5$. On the other hand, the internal diameter of the second elastic ring 12 is 64 mm, and the outer diameter of the second sun roller 22b is 16 mm. Therefore, the rotor 22 integral with the second sun roller 22b is rotated at a speed of five times the rotational speed of the planet carrier 23 because of $(64+16) \div 16 = 5$. Accordingly, the rotor 22 is rotated at an increased speed of twenty-five ($5 \times 5$) times the rotational speed of the hub member 4 with the aid of the first and second planet roller series (24 and 26).

According to the embodiment of FIGS. 14–17 and the modifications of FIGS. 18–21, the tracks to be fitted are formed at contact surfaces between the elastic rings 11, 12 and the planet rollers 24, 26 and between the planet rollers 24, 26 and the sun rollers 23a, 22b, so that these parts are snugly aligned with each other. Therefore, when the planet roller series are rotated, the sun rollers, the planet rollers and the elastic rings are always all guided by the tracks to prevent these parts from shifting in the axial directions. Consequently, by previously providing clearances between these parts, they could not be forcedly rotated due to frictional forces resulting from unfavorable contact between these parts.

Moreover, since the sun rollers, the planet rollers and the elastic rings are all guided with the tracks, there is no longer any chance for the parts to be brought into frictional sliding contact with each other during rotating movement. As a result, the mechanical transmission efficiency of the planet roller series and hence durability of the parts are significantly improved.

As can be appreciated from the foregoing detailed explanation, the built-in generator according to the present invention is small-sized and lightweight, and adapted to operate with high efficiency without any interference with operation of a bicycle, while exhibiting a satisfactory electric power generating performance comparable with that of the conventional attachment-type generator.

While the present invention has been particularly shown and described with reference to certain preferred embodiments thereof, it will be understood by those skilled in the art that the foregoing and other changes in form and details can be made therein without departing from the spirit and scope of the invention.

What is claimed is:

1. A built-in generator, comprising:
   an axle to be fixed to a frame of a bicycle;
   a hub of a bicycle wheel rotatably provided around said axle;
   a hollow cylinder fixed to and around said axle and disposed within said hub, said hollow cylinder having an open end at one end of said axle;
   a generating coil unit disposed within and fixed to said hollow cylinder at the other end of said axle;
   a planetary transmission device comprising a set of elements including a sun roller rotatably provided around and concentric to said axle, a planet carrier disposed adjacent to said sun roller and rotatably provided around said axle at said one end thereof, a plurality of planet rollers supported by said planet carrier and arranged to circumscribe said sun roller, and an elastic ring circumscribing said planet rollers for urging said planet rollers into pressure contact with said sun roller; and
   a rotor magnet rotatably provided around said sun roller adjacent to said coil unit;
   wherein said planetary transmission device transmits rotation of said hub to said rotor magnet to thereby rotate said rotor magnet at a greater velocity than a rotational velocity of said hub.

2. The generator of claim 1, wherein a retainer ring made of an elastic material is provided on the outer circumferential surface of said elastic ring.

3. The generator of claim 1, wherein said elastic ring is made of spring steel.

4. The generator of claim 1, wherein an inner diameter of said elastic ring is smaller than a diameter of an outer circle inscribed by revolution of said planet rollers.

5. The generator of claim 1, wherein said hollow cylinder includes internal gears formed on the inner circumferential surface thereof and said elastic ring includes external gears formed on the outer circumferential surface thereof, said external gears having a smaller pitch than a pitch of said internal gears so as to be loosely fitted with said internal gears.

6. The generator of claim 1, further comprising toothed rings disposed on either side of said elastic ring, said toothed rings each having side teeth on a side facing said elastic ring, said elastic ring including side teeth formed on both sides thereof so as to engage the side teeth of said toothed rings, respectively.

7. The generator of claim 1, wherein said elastic ring includes a grooved track formed on the inner circumferential surface thereof for engaging the outer circumferential surfaces of said planet rollers.

8. The generator of claim 1, wherein each of said planet rollers include tracks formed on the outer circumferential surfaces thereof, said sun roller includes tracks formed on the outer circumferential surface thereof, and said elastic ring includes tracks formed on the inner circumferential surface thereof, such that the tracks of said planet rollers are fitted with the tracks of said run roller and the tracks of said elastic ring.

9. The generator of claim 8, wherein the tracks of said planet rollers comprise ridges extending in a circumferential direction, and the tracks of said sun roller and the tracks of said elastic ring comprise grooves extending in the circumferential direction.

10. The generator of claim 8, wherein the tracks of said planet rollers, the tracks of said sun roller and the tracks of said elastic ring are rectangular in cross section.

11. The generator of claim 8, wherein the tracks of said planet rollers, the tracks of said sun roller and the tracks of said elastic ring are triangular in cross section.

12. The generator of claim 8, wherein the tracks of said planet rollers, the tracks of said sun rollers and the tracks of said elastic ring are semi-circular in cross section.

13. The generator of claim 1, wherein said planetary transmission device further comprises:
    a second sun roller formed integrally with said planet carrier of said set, and being rotatably provided around and concentric to said axle;
    a second planet carrier closing the open end of said hollow cylinder, said second planet carrier being disposed adjacent to said second sun roller and being rotatably provided around said axle;
    a second plurality of planet rollers supported by said second planet carrier and arranged to circumscribe said second sun roller; and
    a second elastic ring circumscribing said second planet rollers for urging said second planet rollers into pressure contact with said second sun roller.

14. The generator of claim 13, further comprising:
    a central toothed ring including side teeth formed on both sides thereof and being disposed between said elastic ring of said set and said second elastic ring; and
    side toothed rings each including side teeth formed on one side thereof and being disposed adjacent to said elastic ring of said one set and said second elastic ring, respectively;
    wherein said elastic ring of said set and said second elastic ring each include side teeth formed on interior and exterior sides thereof, and wherein the side teeth of said central toothed ring are engaged with the interior side teeth of said elastic ring of said set and the interior side teeth of said second elastic ring, respectively, and the side teeth of said side toothed rings are engaged with the exterior side teeth of said elastic ring of said set and the exterior side teeth of said second elastic ring, respectively.

* * * * *